(No Model.) 2 Sheets—Sheet 1.

E. H. SCHELLACK & F. RIDENOUR.
WHEELED VEHICLE.

No. 582,957. Patented May 18, 1897.

WITNESSES:

INVENTORS
E. H. Schellack
F. Ridenour
BY
Munn & Co
ATTORNEYS.

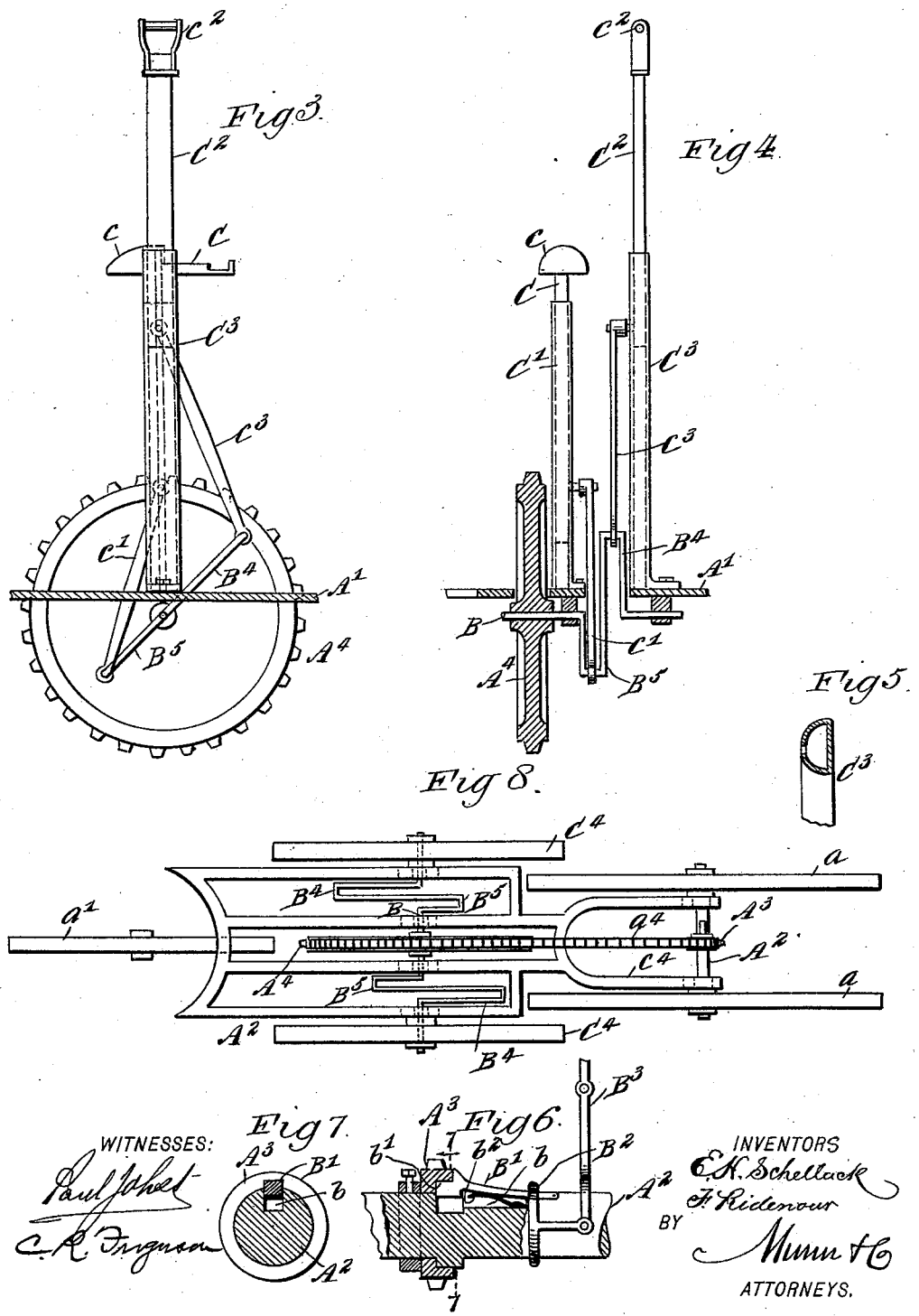

United States Patent Office.

EMIL H. SCHELLACK AND FRANK RIDENOUR, OF FORT DODGE, KANSAS.

WHEELED VEHICLE.

SPECIFICATION forming part of Letters Patent No. 582,957, dated May 18, 1897.

Application filed August 6, 1895. Serial No. 558,411. (No model.)

*To all whom it may concern:*

Be it known that we, EMIL H. SCHELLACK and FRANK RIDENOUR, of Fort Dodge, in the county of Ford and State of Kansas, have invented new and useful Improvements in Wheeled Vehicles, of which the following is a full, clear, and exact description.

This invention relates to vehicles having three or more wheels; and the object is to provide such a vehicle with a driving power that may be operated either by hand or foot or by both the hands and the feet of a rider and so arranged that the vehicle may be forced over the ground or road at a great speed.

We will describe a vehicle embodying our invention and then point out the novel features in the appended claim.

Reference is to be had to the accompanying drawings, forming a part of this specification, in which similar characters of reference indicate corresponding parts in all the views.

Figure 1:
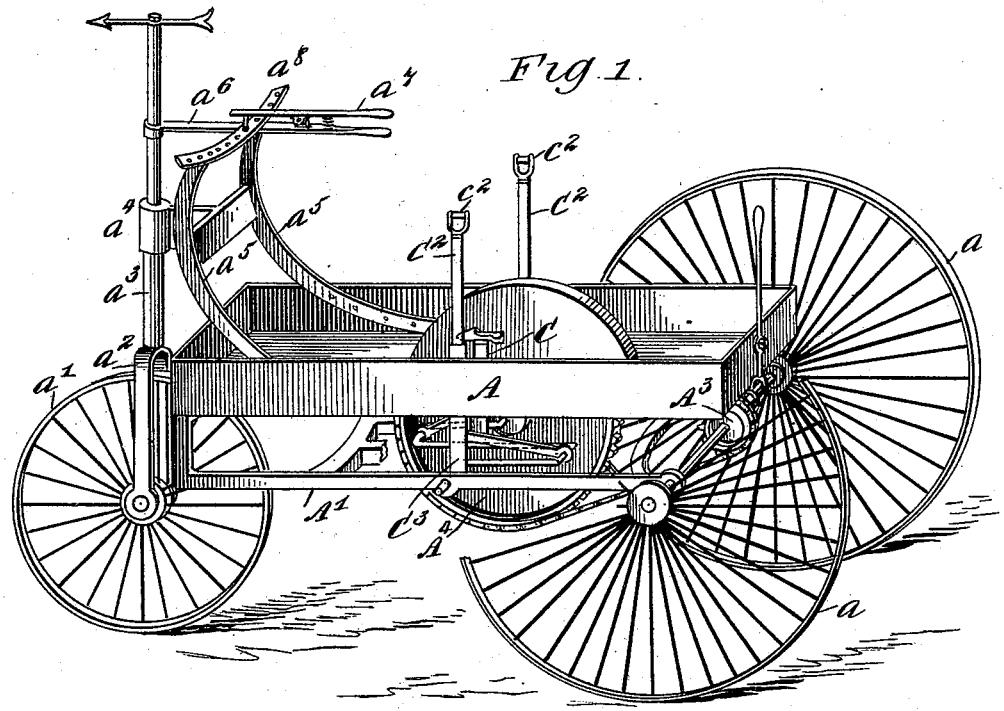
Figure 2:
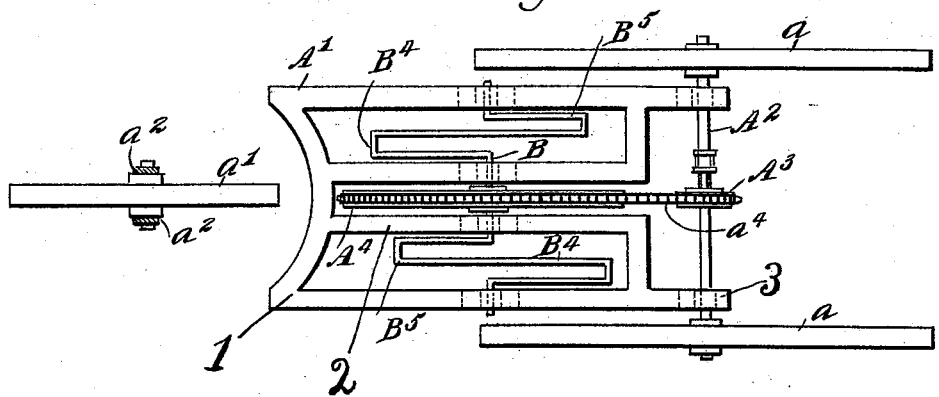

Figure 1 is a perspective side elevation of a vehicle embodying our invention. Fig. 2 is a plan view of the frame and operating mechanism supported thereby. Fig. 3 is a side elevation, on an enlarged scale, of a driving mechanism employed. Fig. 4 is a partial section and partial front elevation of the same. Fig. 5 is a perspective view of a guideway employed. Fig. 6 is a sectional side elevation showing a clutch mechanism employed. Fig. 7 is a transverse section on the line 7 7 of Fig. 6, and Fig. 8 is a plan view of a modification of the frame and operating mechanism.

Referring to the drawings, A designates the body of a vehicle, which may be of any desired form or shape and of a size to accommodate one, two, or more persons, and it is obvious that the body portion may be provided with a seat or seats, which we have not deemed it necessary to show. The body A is supported on a frame A', which, as shown in Fig. 2, consists in a front cross-bar 1, bent rearwardly at its middle, and having the rectangular and longitudinally-elongated side portions 2 projecting rearwardly therefrom, each side portion 2 having a further rearwardly-extended arm 3. To the arms 3 of the frame A' are affixed bearings for the shaft or axle $A^2$, to which the rear traction-wheels $a$ are rigidly secured. $a'$ is the front or steering wheel, the axle of which has bearings in a fork $a^2$, having an upwardly-extending steering-rod $a^3$, adapted to rotate in a bearing $a^4$, supported on an arm extended from the frame $a^5$, projected upward from the body A. From the steering-rod $a^3$ a lever or tiller $a^6$ projects rearwardly over the body of the vehicle, and to this lever or tiller $a^6$ is fulcrumed a spring-controlled dog $a^7$, having a pin or projection adapted to engage in one of a series of holes formed in the transverse bar $a^8$, secured to the upper ends of the arms forming the frame $a^5$. Obviously by operating the lever $a^6$ the wheel $a'$ may be turned laterally to direct the vehicle in any desired course, and it may be secured at any desired angle by means of the dog $a^7$.

Loosely mounted on the shaft or axle $A^2$ is a sprocket-wheel $A^3$, engaged by a sprocket-chain $a^4$, which extends around the driving sprocket-wheel $A^4$, located between the side portions 2 of the frame A' and mounted on a transverse shaft B, having bearings in the side portions 2 of the frame A' and extending from one side of the frame to the other. We provide a clutch or locking mechanism for engaging the sprocket-wheel $A^3$ with the axle or shaft $A^2$ when it is desired to transmit motion to said shaft or axle to propel the vehicle. As shown in Fig. 6, this mechanism consists of a dog B', pivotally connected at one end with the shaft or axle $A^2$ and movable into and out of a recess $b$, formed longitudinally in the shaft or axle $A^2$. The free end of the dog B' is adapted to engage in a notch $b'$, formed in the sprocket-wheel $A^3$, and it is normally held in such engagement by means of a spring $b^2$, secured at one end to the shaft or axle $A^2$ within the recess $b$ and bearing upon the under side of the dog B'.

As a means for forcing the dog B' out of engagement with the sprocket-wheel $A^3$ we employ a sliding ring $B^2$, surrounding the shaft or axle $A^2$ and adapted to slide over the dog B', which, it will be seen, has an upward or outward inclination from its pivotal point. To arms extended from the ring $B^2$ is pivoted the bifurcate end of a shifting lever $B^3$, extended upward and fulcrumed to the body of the vehicle.

On each outer portion of the shaft B are formed the double cranks $B^4 B^5$, the two pairs of cranks being respectively located within the side portions 2 of the frame A'. The cranks B⁴ are extended a greater distance from the axis of the shaft B than are the cranks B⁵. These cranks B⁵ are designed to be engaged by foot-power mechanism and the cranks B⁴ are to be engaged by hand-power mechanism.

C designates foot-plungers movable vertically through guideways C', secured to the frame A' and also to the body portion A, and the upper ends of the foot-plungers are provided with foot-pieces c. From the lower portion of the plungers C links c' extend to a pivotal connection with the cranks B⁵. Hand-plungers C² extend vertically through guides C³, similar to the guides C', and the upper ends of these plungers C² are provided with handpieces c². From the lower portion of the plungers C² links c³ extend to a pivotal connection with the cranks B⁴.

In the modification shown in Fig. 8 we have shown the shaft B as extended outward through the frame A' or through bearings thereon, and these extended ends have balance-wheels C⁴ rigidly attached to them, and in this example of our improvement a fork c⁴ takes the place of the arms 3 and extends rearward from the central portion of the frame A' to the shaft or axle A², supporting the rear wheels a.

In operation the rider places his feet on the foot-pieces c and grasps the handpieces c², and the plungers C C² at opposite sides of the vehicle are alternately raised and lowered by the action of the rider throwing his body from side to side and exerting his weight on the downwardly-moving plungers.

It is obvious that great speed may be attained by the mechanism here shown and described, and that when it is desired to bring the vehicle to a stop or allow it to proceed under the impetus gained in its forward movement the dog B' may be released from the sprocket-wheel A³ by actuating the shifting lever B³.

In the first example of our improvement the sprocket-wheel A⁴ is designed to be quite heavy, so as to serve as a balance-wheel.

Having thus described our invention, we claim as new and desire to secure by Letters Patent—

The combination of a shaft having a longitudinal groove in its surface, a dog pivotally mounted to move in and out of said groove, a spring contained within the groove and pressing the dog, a gear-wheel loosely mounted on the shaft and capable of connection with the dog to revolve with the shaft, a collar slidable on the shaft and capable of moving on and off the dog to press the same within the groove, and an operating-lever connected to the collar, substantially as described.

EMIL H. SCHELLACK.
FRANK RIDENOUR.

Witnesses:
JOSEPH TIMMONS,
THOMAS ROBERTS.